(12) United States Patent
Kuehnel et al.

(10) Patent No.: US 9,713,174 B2
(45) Date of Patent: Jul. 18, 2017

(54) CONNECTION TETHERING AND SERVICE REMOTING

(75) Inventors: Thomas W. Kuehnel, Seattle, WA (US); Shai Guday, Redmond, WA (US); James M. Lyon, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 660 days.

(21) Appl. No.: 13/493,451

(22) Filed: Jun. 11, 2012

(65) Prior Publication Data

US 2013/0331028 A1 Dec. 12, 2013

(51) Int. Cl.
*H04B 5/00* (2006.01)
*H04W 76/02* (2009.01)
*H04W 88/04* (2009.01)

(52) U.S. Cl.
CPC ............ *H04W 76/02* (2013.01); *H04W 88/04* (2013.01)

(58) Field of Classification Search
CPC ...... H04W 76/02; H04W 88/04; Y02B 60/50; H04B 7/00
USPC ............. 455/41.1, 41.2; 709/206, 255
See application file for complete search history.

(56) References Cited

U.S. PATENT DOCUMENTS

| | | | |
|---|---|---|---|
| 2007/0266173 A1* | 11/2007 | Wong et al. | 709/238 |
| 2007/0285258 A1* | 12/2007 | Hartman | 340/573.1 |
| 2009/0164253 A1* | 6/2009 | Lyshkow | 705/3 |
| 2010/0153983 A1* | 6/2010 | Philmon et al. | 725/13 |
| 2011/0283001 A1* | 11/2011 | Jung et al. | 709/227 |
| 2012/0028603 A1* | 2/2012 | Gorman et al. | 455/408 |
| 2012/0084430 A1* | 4/2012 | Lu | G06Q 30/02 709/224 |
| 2012/0101952 A1* | 4/2012 | Raleigh | G06Q 30/016 705/304 |
| 2012/0264375 A1* | 10/2012 | Shankaranarayanan | 455/41.2 |
| 2013/0151181 A1* | 6/2013 | Sebastiani et al. | 702/63 |
| 2013/0195088 A1* | 8/2013 | Ho et al. | 370/338 |
| 2013/0238723 A1* | 9/2013 | Balannik et al. | 709/206 |

* cited by examiner

*Primary Examiner* — Xin Jia (57) ABSTRACT

Described is a technology by which a target device automatically starts tethering on a source device. A target device sends a request to start tethering to the source device, which responds by starting tethering, independent of needing any user interaction on the source device. While tethering is operational, status messages may be exchanged between the source device and the target device.

18 Claims, 5 Drawing Sheets

CONNECTION TETHERING AND SERVICE REMOTING

BACKGROUND

Many contemporary mobile devices such as smartphones are equipped with Internet connectivity, such as via 3G and 4G connectivity. Internet sharing using such devices, often referred to as tethering, allows other devices to use a shared device as a wireless network (Wi-Fi) access point/router or the like. In this way, for example, a user can have mobile Internet via a Wi-Fi connection on a laptop or tablet to his or her cell phone that has 3G or 4G Internet connectivity.

However, setting up tethering is a cumbersome user process. For example, to enable tethering, the user has to perform certain actions on the source device that does the sharing, basically to navigate the correct menus and turn sharing on, as well as most likely setting up security to avoid unauthorized users from sharing the connection. The target device likewise requires user interaction.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which a source device receives a request from a target device to use a cellular modem of the source device for tethering. In response, the source device establishes a tethering connection with the target device, and uses the tethering connection to communicate data received via the cellular modem to the target device, and to communicate data from the target device to a network recipient via the cellular modem.

In one aspect, a target device includes a target tethering program configured to request a source device to provide tethering. The tethering program sends a tethering request over a first communications mechanism to the source device to activate tethering over a second communications mechanism without user interaction on the source device.

In one aspect, upon receiving a request over a first communications mechanism of a source device to provide tethering to a target device, a message is sent from the source device over the first communications mechanism to the target device to indicate that tethering is operational. Tethering is automatically provided to communicate data between an Internet source that is coupled to the source device, to and from the target device, over a second communications mechanism.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards a straightforward mechanism for providing Internet sharing such that with little effort, a user device obtains a shared connection to a cellular device. For example, the target (client) device may automatically act and show a user interface as if the target device had a built-in 3G or 4G cellular modem, or operate as if any other wireless access point/router had become available to the client device. In one aspect, as little as a single click activation on the target device is provided as a mechanism to provide this functionality, including to establish the connection.

In one aspect, upon receiving at a source device a request from a target device to use a cellular modem of the source device for tethering, a tethering connection is established with the target device. The tethering connection is sued to communicate data via the cellular modem to and from the target device. The tethering may be automatically set up upon launching a program on the target device that communicates over a communications mechanism such as Bluetooth® to request that a sharing program be launched on the source device.

It should be understood that any of the examples herein are non-limiting. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computing and data communication in general.

Figure 1:
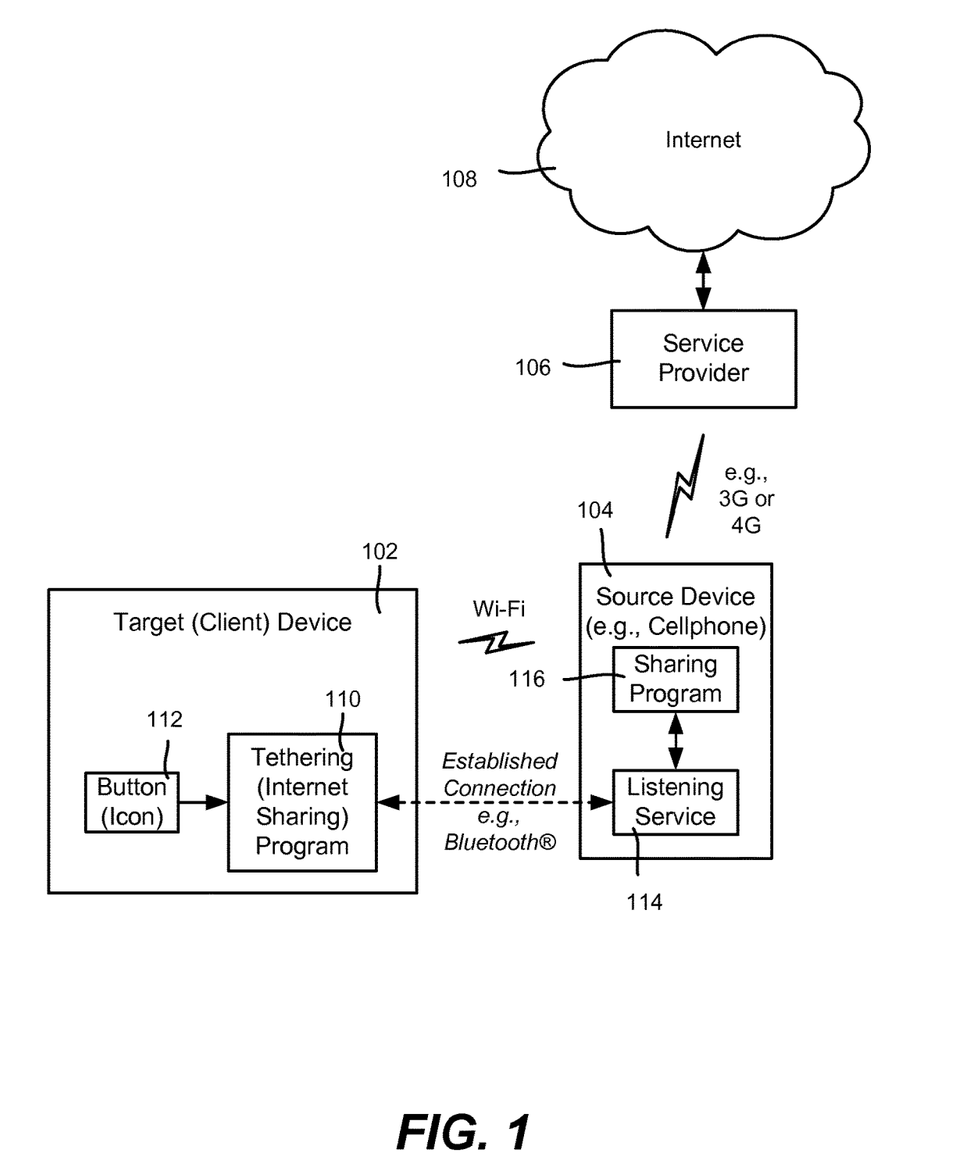
FIG. 1 is a block diagram showing example components of a system that provides automatic tethering according to one example implementation.

FIG. 1 shows a generalized example block diagram in which a target (client) device 102 is configured to communicate with a source device 104 for sharing an internet connection. The target device may be a laptop computer, tablet device, desktop computer with wireless connectivity, or even a device such as a wireless router or bridge. In general, the source device 104, such as a cellular phone, is equipped with cellular technology including an antenna and cellular modem circuitry that provides the source device 102 with access to the Internet 106 via a service provider 108.

As described herein, the target device 102 includes a tethering (Internet sharing) program 110, which, for example, may be invoked by a single button 112 (e.g., an interactive icon on the user's laptop or tablet). Any other straightforward activation command may be used, such as a speech command, key combination, hardware button and so forth (as well as any other way to start a program). Thus, in addition to pointer or keyboard interaction, non-limiting examples of input include speech recognition, touch and stylus recognition, gesture recognition (e.g., on screen and/ or adjacent to the screen), air gestures, head and eye tracking, voice and speech, vision, touch, gestures, and machine intelligence. For purposes of example, a single button 112 is shown.

Moreover, (once initially set up as described below), the tethering program also may be started automatically, without any user interaction. Example startup triggers may be based upon periodic polling, or event-based triggers such as proximity and/or time, prediction based upon passed usage patterns, and so forth. For example, once the target device requests an Internet connection (regardless of how started) and cannot establish a connection using its own radios such as Wi-Fi, the target device may automatically start up the tethering program to try and connect to the source device, e.g., via Bluetooth® to bootstrap the connection as described herein.

The tethering program 110 communicates over an established connection (represented by the dashed line, e.g., Bluetooth®-based) with the source device 104, e.g., to a listening service 114 running on the source device. The listening service 114 is configured to listen for communications (commands) related to Internet sharing, and invoke a source-side Internet sharing program 116. Note that smartphones and the like already have such a listening service for other communications, e.g., for receiving hands free calls, for remote audio control, for GPS-device data, and so forth, and thus Internet sharing may use similar technology.

One such established connection is Bluetooth®, such as using Bluetooth® Low Energy, at least in part; (initial pairing of the devices over Bluetooth® or the like is described below). This provides a low-energy connection, and provides a number of benefits, including that the user need not touch the device for Internet sharing to function. Another advantage is that Bluetooth® provides a mechanism for automatically turning off sharing, such as when the smartphone stops communication, e.g., turns off or is put into an airplane mode, or the target device changes state to stop communicating (e.g., the laptop lid closes). An alternative type of connection may be based upon USB or IEEE 1394 technology and the like, which although generally not as convenient as Bluetooth® because of the need for a physical connection, is available on many devices, and further may charge the smartphone battery. USB and the like can also transfer Internet data, to provide "wired-tethering" scenarios. Other wireless technologies may be used, e.g., such as ZigBee®, NFC (Near Field Communication), infrared and so forth.

Figure 2:
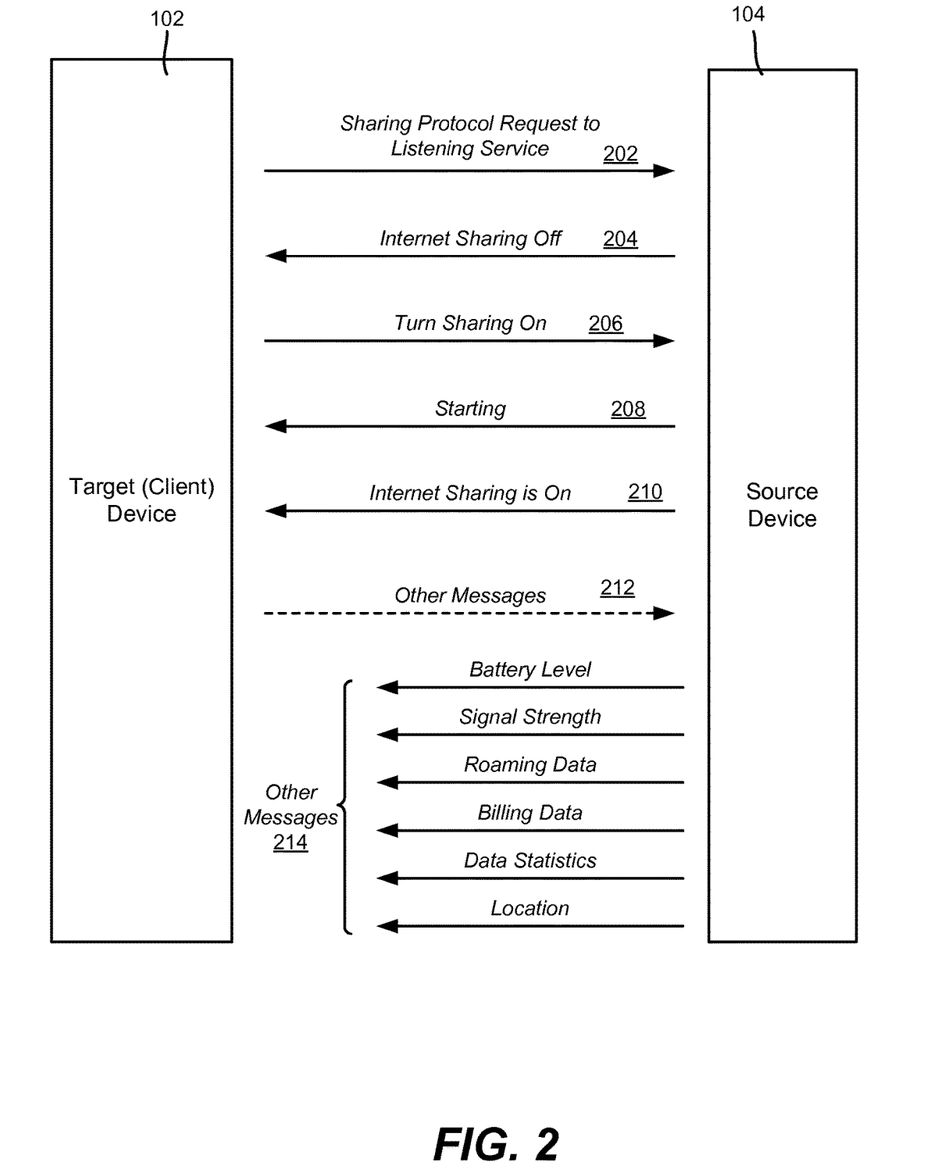
FIG. 2 is a diagram showing a representation of tethering-related messages exchanged between a target device and a source device, according to one example implementation.

FIG. 2 shows an example protocol by which Internet sharing is turned on from the target device with no interaction with the source device needed. As will be understood, this enables scenarios such as a user working on a laptop to click an icon (e.g., the button 112) on the laptop to easily obtain Wi-Fi access via a smartphone, while the smartphone remains basically untouched in the user's purse, briefcase or pocket, for example.

In FIG. 2, the button press or other activation mechanism causes the target device 102 to send a sharing protocol request message 202 to the listening service of the source device 104, basically initiating the sharing operations, including waking up the source device to the extent needed. In this example, sharing is not currently turned on, and the source device 104 responds with a status information message 204 indicating that sharing is off (but is available). Note that if the source device 104 is already in a sharing mode, the returned message may be that sharing is on (message 210 as described below). Further note that if already in a sharing mode, the user may alternatively obtain a connection by connecting via a "View Available Networks" user interface or the like, which Wi-Fi-enabled devices already possess.

In this example where sharing is not yet on, the target device 102 requests that sharing be turned on via a message 206. The source device 104 starts the sharing service, e.g., as if the user had manually navigated the source device's menus to turn it on, and responds with a starting status message 208, by which the target device 102 may take some action, e.g., open the program that will select the network connection when ready. When the source device enters the sharing mode, an internet sharing "turned on" message 210 is also communicated. Note that if the startup is fast enough, the message 208 need not be sent.

At this time, a representation of the source device 104 may appear as an available wireless network in the laptop's appropriate wireless network interface. Such an interface may be configured to automatically connect to the wireless network, e.g., via a priority list. Various rules may be used such as to automatically connect upon pressing the button 112, or for cost savings on a limited data plan, only connect to this network automatically if no other (free) wireless networks are available. In this way, a Wi-Fi connection is provided via the source device 104 that allows the target device to access the Internet.

As also represented in FIG. 2, once the established connection exists, the target device 102 may send other messages 212 to the source device (e.g., turn sharing off), and various additional information may be remoted via messages 214 to the target device 102. Such other remoted, tethering-related information may include state data such as source device battery level, signal strength, roaming data, billing data, and data statistics (e.g., how much data the plan allows and how much is used). Carrier ID data also may be sent. In general, the source device 104 may package up one or more of these sets of data into one or more Bluetooth® communications to the target device 102, which is sufficiently fast for such types of information; (note that while this other information may be exchanged over the established Bluetooth® or other connection, it is feasible to send it over Wi-Fi, at a likely cost of more energy being consumed for such a transmission). In this way, the target device 102 may output status information on its own display regarding the source device 104, and/or make decisions/request user decisions based upon the status information.

In this example, the target device 102 is thus aware of the source device's information, including that the connection is a cellular connection that may be possibly limited and/or costly, whereby some action may be taken. For example, the tethering program 110 on the source device may provide a notification to other services and programs that limit how much data the other services and programs are able to download. As a more particular example, the target-side tethering program 110 may instruct an update service on the laptop not to download large updates (or possibly not to download any updates) unless and until a non-cellular-based (Wi-Fi or wired) connection becomes available or the user specifically confirms such a download. Similarly, a program such as a browser or email application may be instructed to operate in a reduced data mode when using a tethered connection, e.g., only download images on demand, emulate a phone's browser, access sites designed for mobile access, and so on.

Further, Wi-Fi Direct™ is a Wi-Fi-based technology that may be used for power efficiency. As is known, such a direct mode uses less energy via power saving protocols that provide relatively longer sleep states for device Wi-Fi components.

As also represented in FIG. 2, location data may be sent if available to the source device 102, as well as anything else the source device 104 senses (e.g., compass data) or otherwise possesses. In this way, for example, a laptop or tablet without GPS is able to pinpoint the source device's current location via the source device's GPS, such as for viewing on a map, which is also the target device's location (at least to within Bluetooth® communication range if Bluetooth® is being used).

Turning to initial configuration, the target device 102 and source device 104 have at least a one-time controlled exchange of information so that the devices are aware of each other and are authorized to operate for Internet sharing. For example, if Bluetooth® is used for the established connection, the target device 102 and source device 104 may be paired. Note that Bluetooth® discovery (conventional or by tapping the devices together) is one mechanism for such pairing, but others are feasible, e.g., when a user connects a phone to a personal computer via a USB connection, Bluetooth® data may be exchanged. RFID, near field communications, barcode reading (e.g., if each device has a camera or other barcode scanner) and so forth may be used to pair the target device with the client device. Wi-Fi Protected Setup (WPS) allows a push-button setup model that can also be used to provide a secure channel, which may then be used to exchange information such as Bluetooth® ID/credentials and other data. In this way, the target tethering program 110 (FIG. 1) and the source sharing program 116 (FIG. 1) are provisioned with same Wi-Fi credentials.

Once paired, in the Bluetooth® example, the target device may be asked which Bluetooth® services (e.g., listening services) the user wants to use of the source device. One of these includes the Internet sharing service described herein.

Figure 3:
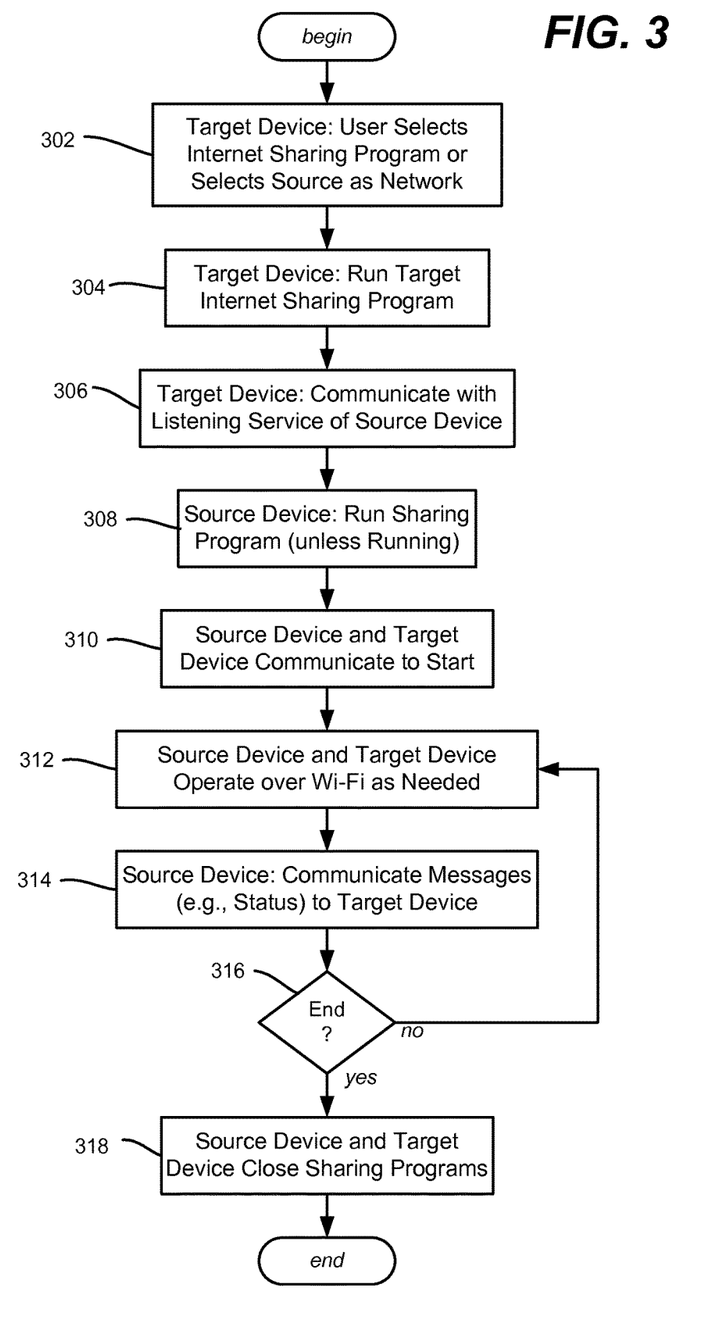
FIG. 3 is a flow diagram representing example steps that may be taken to facilitate automatic tethering, according to one example implementation.

To summarize, FIG. 3 shows example steps of the target and source devices according to one example implementation. As represented by step 302, the user operating the target device 102 may start the tethering program 110 (e.g., run a "Tether" application) or select the source device 104 as a connection in the "View Available Networks" user interface or the like, e.g., by a name with which the user is familiar. At step 304, the tethering program 110 is loaded and run on the target device.

In the example, of FIG. 3, at step 306 the tethering program 110 on the target device 102 communicates via Bluetooth® to the wake up/listening service 114 on the source device 104. In response, at step 308 the service 114 on the source device 104 starts the sharing program 116 on the device (unless already running). Step 308 represents communicating to start the Wi-Fi connection, as described above with reference to FIG. 2, e.g., including a "Started" message or the like. The tethering program 110 of the target device 102 thus connects to the sharing program 116 automatically.

At this step (step 312) the devices are now tethered, e.g., a user can surf the Internet, download emails and so forth via the source device as its modem over Wi-Fi (which may be Wi-Fi Direct™ if appropriately preconfigured or user-selected). Step 314 represents the communication of messages (e.g., status) from the source device 104 to the target device 104 as described above, e.g., over Bluetooth® (as well as any messages that may be sent in the other direction).

The general operation continues at step 316 until something ends the process. For example, the user on the target device 102 may stop the tethering program 110 or choose to disconnect from the network in virtually any way, e.g., directly via interaction or indirectly such as by shutting the laptop lid, powering down the device and so forth. The user may also choose to end sharing from the target device 104, e.g., by interacting to stop the sharing program 116. Alternatively, the device may disconnect for any other reason, e.g. the devices may go out of communication range (as with other Bluetooth® applications) or otherwise have such an inability to communicate (yet may include a reasonable timeout first to ensure that a very brief communication failure does not result in a full restart being needed). Step 318 represents closing the sharing programs if not already closed.

Example Operating Environment

Figure 4:
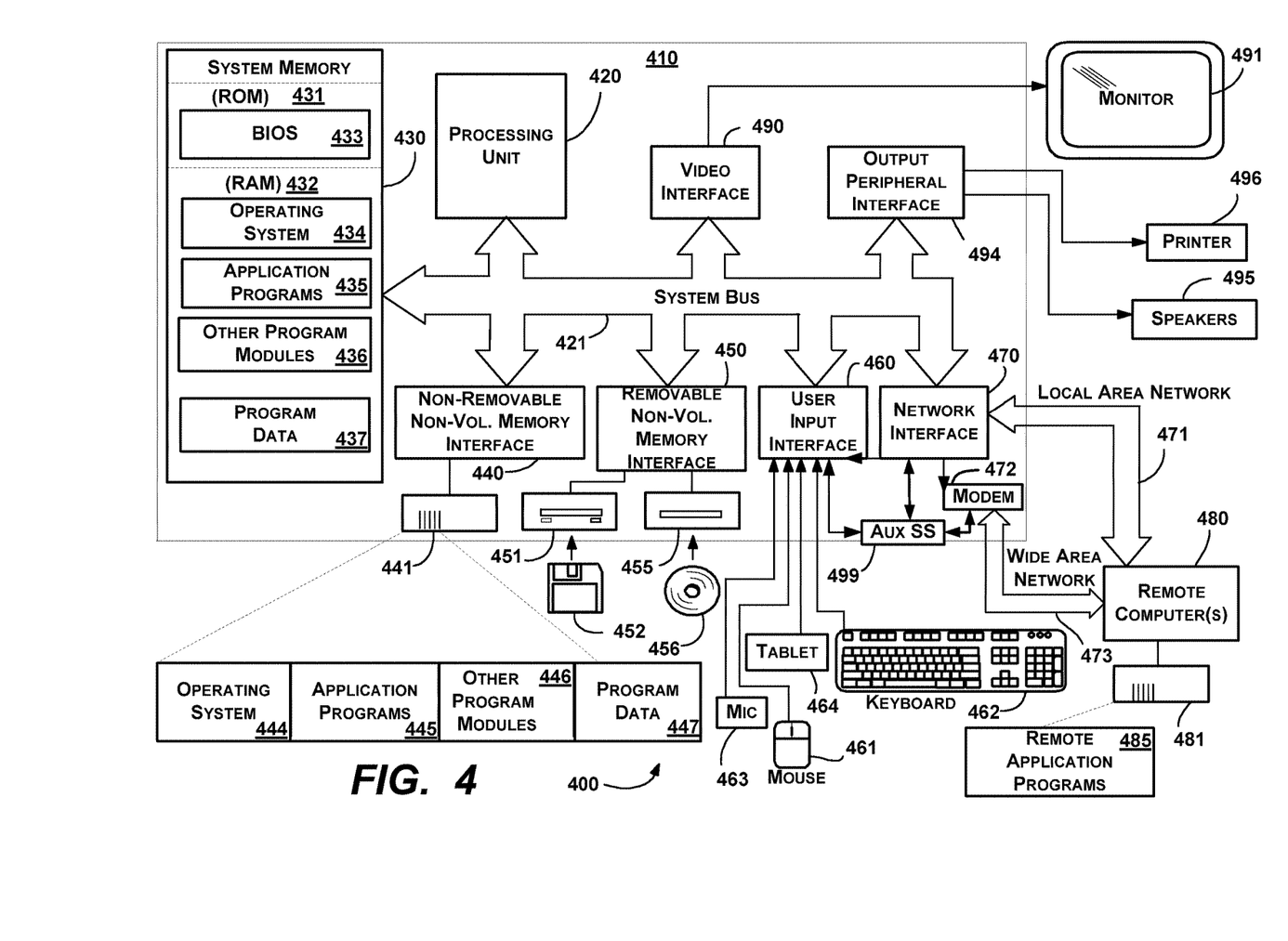
FIG. 4 is a block diagram representing an example computing environment into which aspects of the subject matter described herein may be incorporated.

FIG. 4 illustrates an example of a suitable computing and networking environment 400 into which the examples and implementations of any of FIGS. 1-3 may be implemented, for example. The computing system environment 400 is only one example of a suitable computing environment and is not intended to suggest any limitation as to the scope of use or functionality of the invention. Neither should the computing environment 400 be interpreted as having any dependency or requirement relating to any one or combination of components illustrated in the example operating environment 400.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 4, an example system for implementing various aspects of the invention may include a general purpose computing device in the form of a computer 410. Components of the computer 410 may include, but are not limited to, a processing unit 420, a system memory 430, and a system bus 421 that couples various system components including the system memory to the processing unit 420. The system bus 421 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 410 typically includes a variety of computer-readable media. Computer-readable media can be any available media that can be accessed by the computer 410 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 410. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above may also be included within the scope of computer-readable media.

The system memory 430 includes computer storage media in the form of volatile and/or nonvolatile memory such as read only memory (ROM) 431 and random access memory (RAM) 432. A basic input/output system 433 (BIOS), containing the basic routines that help to transfer information between elements within computer 410, such as during start-up, is typically stored in ROM 431. RAM 432 typically contains data and/or program modules that are immediately accessible to and/or presently being operated on by processing unit 420. By way of example, and not limitation, FIG. 4 illustrates operating system 434, application programs 435, other program modules 436 and program data 437.

The computer 410 may also include other removable/non-removable, volatile/nonvolatile computer storage media. By way of example only, FIG. 4 illustrates a hard disk drive 441 that reads from or writes to non-removable, nonvolatile magnetic media, a magnetic disk drive 451 that reads from or writes to a removable, nonvolatile magnetic disk 452, and an optical disk drive 455 that reads from or writes to a removable, nonvolatile optical disk 456 such as a CD ROM or other optical media. Other removable/non-removable, volatile/nonvolatile computer storage media that can be used in the example operating environment include, but are not limited to, magnetic tape cassettes, flash memory cards, digital versatile disks, digital video tape, solid state RAM, solid state ROM, and the like. The hard disk drive 441 is typically connected to the system bus 421 through a non-removable memory interface such as interface 440, and magnetic disk drive 451 and optical disk drive 455 are typically connected to the system bus 421 by a removable memory interface, such as interface 450.

The drives and their associated computer storage media, described above and illustrated in FIG. 4, provide storage of computer-readable instructions, data structures, program modules and other data for the computer 410. In FIG. 4, for example, hard disk drive 441 is illustrated as storing operating system 444, application programs 445, other program modules 446 and program data 447. Note that these components can either be the same as or different from operating system 434, application programs 435, other program modules 436, and program data 437. Operating system 444, application programs 445, other program modules 446, and program data 447 are given different numbers herein to illustrate that, at a minimum, they are different copies. A user may enter commands and information into the computer 410 through input devices such as a tablet, or electronic digitizer, 464, a microphone 463, a keyboard 462 and pointing device 461, commonly referred to as mouse, trackball or touch pad. Other input devices not shown in FIG. 4 may include a joystick, game pad, satellite dish, scanner, or the like. These and other input devices are often connected to the processing unit 420 through a user input interface 460 that is coupled to the system bus, but may be connected by other interface and bus structures, such as a parallel port, game port or a universal serial bus (USB). A monitor 491 or other type of display device is also connected to the system bus 421 via an interface, such as a video interface 490. The monitor 491 may also be integrated with a touch-screen panel or the like. Note that the monitor and/or touch screen panel can be physically coupled to a housing in which the computing device 410 is incorporated, such as in a tablet-type personal computer. In addition, computers such as the computing device 410 may also include other peripheral output devices such as speakers 495 and printer 496, which may be connected through an output peripheral interface 494 or the like.

The computer 410 may operate in a networked environment using logical connections to one or more remote computers, such as a remote computer 480. The remote computer 480 may be a personal computer, a server, a router, a network PC, a peer device or other common network node, and typically includes many or all of the elements described above relative to the computer 410, although only a memory storage device 481 has been illustrated in FIG. 4. The logical connections depicted in FIG. 4 include one or more local area networks (LAN) 471 and one or more wide area networks (WAN) 473, but may also include other networks. Such networking environments are commonplace in offices, enterprise-wide computer networks, intranets and the Internet.

When used in a LAN networking environment, the computer 410 is connected to the LAN 471 through a network interface or adapter 470. When used in a WAN networking environment, the computer 410 typically includes a modem 472 or other means for establishing communications over the WAN 473, such as the Internet. The modem 472, which may be internal or external, may be connected to the system bus 421 via the user input interface 460 or other appropriate mechanism. A wireless networking component 474 such as comprising an interface and antenna may be coupled through a suitable device such as an access point or peer computer to a WAN or LAN. In a networked environment, program modules depicted relative to the computer 410, or portions thereof, may be stored in the remote memory storage device. By way of example, and not limitation, FIG. 4 illustrates remote application programs 485 as residing on memory device 481. It may be appreciated that the network connections shown are examples and other means of establishing a communications link between the computers may be used.

An auxiliary subsystem 499 (e.g., for auxiliary display of content) may be connected via the user interface 460 to allow data such as program content, system status and event notifications to be provided to the user, even if the main portions of the computer system are in a low power state. The auxiliary subsystem 499 may be connected to the modem 472 and/or network interface 470 to allow communication between these systems while the main processing unit 420 is in a low power state.

Figure 5:
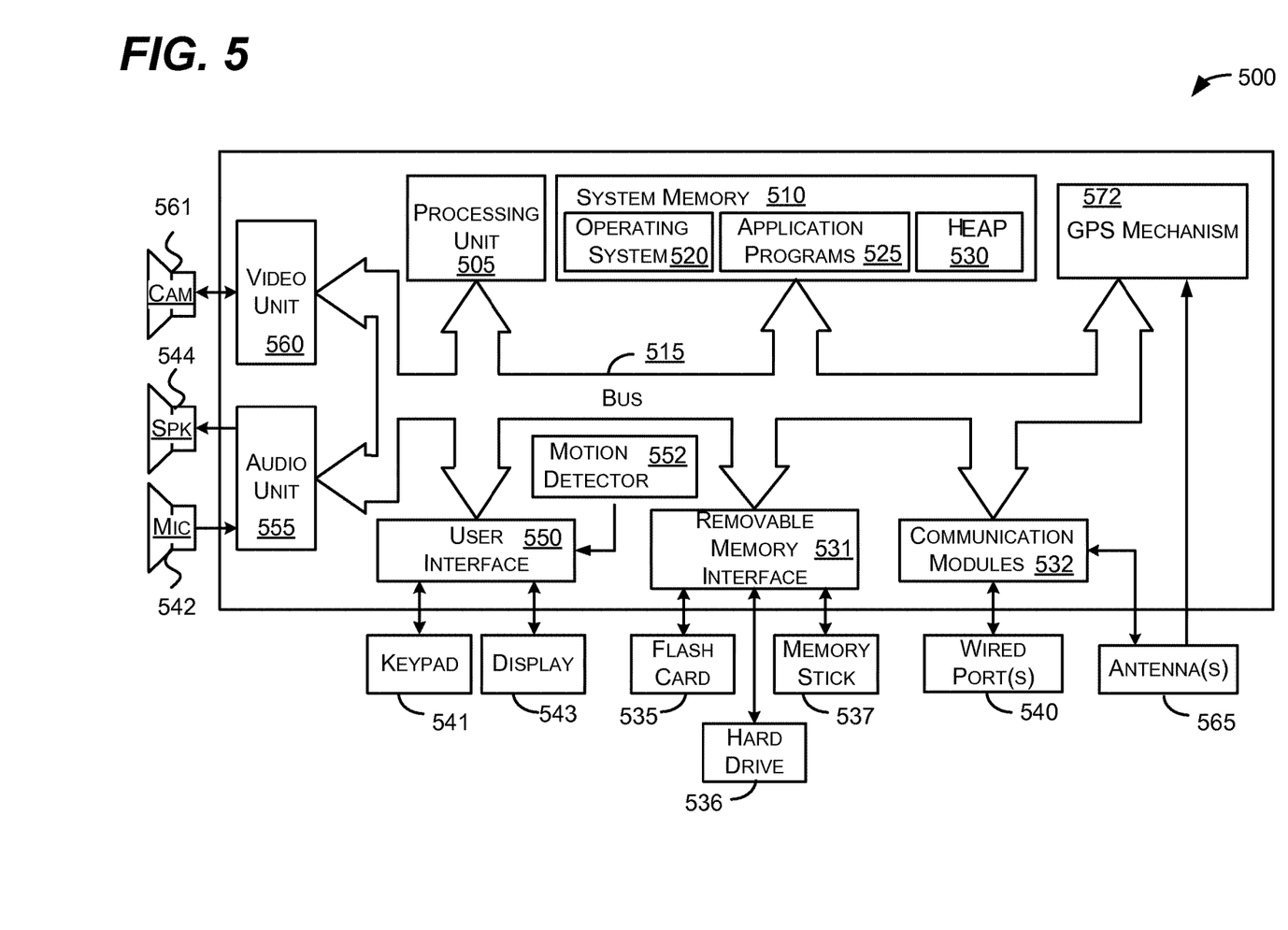
FIG. 5 is a block diagram representing an example non-limiting computing system or operating environment, e.g., in the example of a mobile phone device, in which one or more aspects of various embodiments described herein can be implemented.

FIG. 5 illustrates an example of a suitable mobile device 500 on which aspects of the subject matter described herein may be implemented. The mobile device 500 is only one example of a device and is not intended to suggest any limitation as to the scope of use or functionality of aspects of the subject matter described herein, e.g., a personal computer that is not ordinarily considered mobile may benefit from the technology described herein. Neither should the mobile device 500 be interpreted as having any dependency or requirement relating to any one or combination of components illustrated in the example mobile device 500.

With reference to FIG. 5, an example device for implementing aspects of the subject matter described herein includes a mobile device 500. In some embodiments, the mobile device 500 comprises a cell phone, a handheld device that allows voice communications with others, some other voice communications device, or the like. In these embodiments, the mobile device 500 may be equipped with a camera for taking pictures, although this may not be required in other embodiments. In other embodiments, the mobile device 500 may comprise a personal digital assistant (PDA), hand-held gaming device, notebook computer, printer, appliance including a set-top, media center, or other appliance, other mobile devices, or the like. In yet other embodiments, the mobile device 500 may comprise devices that are generally considered non-mobile such as personal computers, servers, or the like.

Components of the mobile device 500 may include, but are not limited to, a processing unit 505, system memory 510, and a bus 515 that couples various system components including the system memory 510 to the processing unit 505. The bus 515 may include any of several types of bus structures including a memory bus, memory controller, a peripheral bus, and a local bus using any of a variety of bus architectures, and the like. The bus 515 allows data to be transmitted between various components of the mobile device 500.

The mobile device 500 may include a variety of computer-readable media. Computer-readable media can be any available media that can be accessed by the mobile device 500 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the mobile device 500.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, Bluetooth®, Wireless USB, infrared, WiFi, WiMAX, and other wireless media. Combinations of any of the above should also be included within the scope of computer-readable media.

The system memory 510 includes computer storage media in the form of volatile and/or nonvolatile memory and may include read only memory (ROM) and random access memory (RAM). On a mobile device such as a cell phone, operating system code 520 is sometimes included in ROM although, in other embodiments, this is not required. Similarly, application programs 525 are often placed in RAM although again, in other embodiments, application programs may be placed in ROM or in other computer-readable memory. The heap 530 provides memory for state associated with the operating system 520 and the application programs 525. For example, the operating system 520 and application programs 525 may store variables and data structures in the heap 530 during their operations.

The mobile device 500 may also include other removable/non-removable, volatile/nonvolatile memory. By way of example, FIG. 5 illustrates a flash card 535, a hard disk drive 536, and a memory stick 537. The hard disk drive 536 may be miniaturized to fit in a memory slot, for example. The mobile device 500 may interface with these types of nonvolatile removable memory via a removable memory interface 531, or may be connected via a universal serial bus (USB), IEEE 5394, one or more of the wired port(s) 540, or antenna(s) 565. In these embodiments, the removable memory devices 535-937 may interface with the mobile device via the communications module(s) 532. In some embodiments, not all of these types of memory may be included on a single mobile device. In other embodiments, one or more of these and other types of removable memory may be included on a single mobile device.

In some embodiments, the hard disk drive 536 may be connected in such a way as to be more permanently attached to the mobile device 500. For example, the hard disk drive 536 may be connected to an interface such as parallel advanced technology attachment (PATA), serial advanced technology attachment (SATA) or otherwise, which may be connected to the bus 515. In such embodiments, removing the hard drive may involve removing a cover of the mobile device 500 and removing screws or other fasteners that connect the hard drive 536 to support structures within the mobile device 500.

The removable memory devices 535-937 and their associated computer storage media, discussed above and illustrated in FIG. 5, provide storage of computer-readable instructions, program modules, data structures, and other data for the mobile device 500. For example, the removable memory device or devices 535-937 may store images taken by the mobile device 500, voice recordings, contact information, programs, data for the programs and so forth.

A user may enter commands and information into the mobile device 500 through input devices such as a key pad 541 and the microphone 542. In some embodiments, the display 543 may be touch-sensitive screen and may allow a user to enter commands and information thereon. The key pad 541 and display 543 may be connected to the processing unit 505 through a user input interface 550 that is coupled to the bus 515, but may also be connected by other interface and bus structures, such as the communications module(s) 532 and wired port(s) 540. Motion detection 552 or other sensors such as accelerometers can be used to determine gestures made with the device 500.

A user may communicate with other users via speaking into the microphone 542 and via text messages that are entered on the key pad 541 or a touch sensitive display 543, for example. The audio unit 555 may provide electrical signals to drive the speaker 544 as well as receive and digitize audio signals received from the microphone 542.

The mobile device 500 may include a video unit 560 that provides signals to drive a camera 561. The video unit 560 may also receive images obtained by the camera 561 and provide these images to the processing unit 505 and/or memory included on the mobile device 500. The images obtained by the camera 561 may comprise video, one or more images that do not form a video, or some combination thereof.

The communication module(s) 532 may provide signals to and receive signals from one or more antenna(s) 565. One of the antenna(s) 565 may transmit and receive messages for a cell phone network. Another antenna may transmit and receive Bluetooth® messages. Yet another antenna (or a shared antenna) may transmit and receive network messages via a wireless Ethernet network standard.

Still further, an antenna provides location-based information, e.g., GPS signals to a GPS interface and mechanism 572. In turn, the GPS mechanism 572 makes available the corresponding GPS data (e.g., time and coordinates) for processing.

In some embodiments, a single antenna may be used to transmit and/or receive messages for more than one type of network. For example, a single antenna may transmit and receive voice and packet messages.

When operated in a networked environment, the mobile device 500 may connect to one or more remote devices. The remote devices may include a personal computer, a server, a router, a network PC, a cell phone, a media playback device, a peer device or other common network node, and typically includes many or all of the elements described above relative to the mobile device 500.

Aspects of the subject matter described herein are operational with numerous other general purpose or special purpose computing system environments or configurations. Examples of well known computing systems, environments, and/or configurations that may be suitable for use with aspects of the subject matter described herein include, but are not limited to, personal computers, server computers, hand-held or laptop devices, multiprocessor systems, microcontroller-based systems, set top boxes, programmable consumer electronics, network PCs, minicomputers, mainframe computers, distributed computing environments that include any of the above systems or devices, and the like.

Aspects of the subject matter described herein may be described in the general context of computer-executable instructions, such as program modules, being executed by a mobile device. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

Furthermore, although the term server may be used herein, it will be recognized that this term may also encompass a client, a set of one or more processes distributed on one or more computers, one or more stand-alone storage devices, a set of one or more other devices, a combination of one or more of the above, and the like.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a computing environment, a method for seamlessly providing network connectivity between a source device and a target device in a tethered manner, the method comprising:
   receiving, at the source device, a request from the target device to use a cellular modem of the source device for tethering, the request being automatically sent from the target device in response to launching a tethering program on the target device, the tethering program being launched based upon automatic triggering at the target device;
   in response to the request, launching a sharing program on the source device for establishing a tethering connection between the source device and the target device with the target device independent of any user interaction;
   using the tethering connection to communicate data received via the cellular modem to the target device;
   providing one or more status messages from the source device to the target device while tethering is operational, the one or more status messages indicating an amount of data the source device has currently used of a data plan of the source device, the target device outputting status information regarding the source device on a display of the target device; and
   using the tethering connection to communicate data from the target device to a network recipient via the cellular modem,
   wherein the sharing program is in an off state prior to launching the sharing program on the source device and receiving the request from the target device to use the cellular modem of the source device for tethering.

2. The method of claim 1, wherein establishing the tethering connection further comprises:
   setting up a wireless network connection.

3. The method of claim 1, wherein receiving at the source device, the request from the target device, further comprises:
   receiving a message at a listening service.

4. The method of claim 1 wherein receiving at the source device, the request from the target device, further comprises:
   receiving the one or more status messages at a listening service over a wireless low-energy connection.

5. The method of claim 1, wherein a state data further comprises source device roaming data, and wherein providing the one or more status messages from the source device to the target device while tethering is operational further comprises:
   sending a status message containing the roaming data to the target device.

6. The method of claim 1, wherein a state data further comprises a source device battery level and a source device signal strength, and wherein communicating the one or more status messages further comprises:
   sending a battery level message and a signal strength message to the target device, wherein the target device outputs the status information regarding the battery level and signal strength of the source device on the display of the target device.

7. The method of claim 1, wherein a state data further comprises source device billing data and source device data statistics, and wherein communicating the one or more status messages further comprises:

sending a billing-related data message and a data statistics message to the target device, wherein the target device outputs the status information regarding the source device billing data and the source device data statistics on the display of the target device.

8. The method of claim 1, further comprising:

automatically starting the tethering program on the target device in response to selection of the source device as a connection in a user interface of available networks on the target device.

9. The method of claim 1, further comprising:

viewing a representation of the source device as an available wireless network within a user interface of the target device.

10. In a computing environment, a system for seamlessly providing network connectivity between a source device and a target device in a tethered manner, the system comprising:

a target device, including a target tethering program for requesting a source device to provide tethering, the tethering program configured to send a tethering request over a first communications mechanism to the source device to request turning on of network sharing on the source device and activation of tethering over a second communications mechanism independent of any user interaction on the source device, the request being automatically sent from the target device in response to launching a tethering program on the target device;

the target tethering program is further configured to:
receive one or more status messages from the source device, the one or more status messages indicating an amount of data the source device has currently used of a data plan of the source device, and
request, on the target device, a user decision related to the tethering program of the target device based on the amount of data the source device has currently used of the data plan, wherein the source device is woken up upon receipt of said requesting, from the target device, for the source device to provide said tethering.

11. The system of claim 10, wherein the tethering program is configured to notify at least one other program on the target device that tethering is active.

12. The system of claim 10, wherein the first communications mechanism further comprises a wireless low-energy connection, and wherein the second communications mechanism further comprises a Wi-Fi connection.

13. The system of claim 10, wherein the one or more status messages further comprises at least one of battery level data, signal strength data, roaming data, billing data, or carrier data.

14. The system of claim 10, wherein the target device further comprises:

a desktop personal computer, gaming console, laptop personal computer, tablet computer, or cellular phone.

15. One or more computer-readable memory devices having computer-executable instructions, which upon execution perform operations, comprising:

receiving a request over a first communications mechanism of a source device to provide tethering to a target device, the request being automatically sent from the target device to the source device in response to launching a tethering program on the target device, the tethering program being in an off state and being launched based upon automatic triggering at the target device;

sending a message from the source device over the first communications mechanism to the target device, the message indicating that tethering is operational;

automatically providing tethering to communicate data between an Internet source coupled to the source device to and from the target device over a second communications mechanism, the tethering connection being established with the target device independent of any user interaction; and providing one or more status messages from the source device to the target device while tethering is operational, wherein the one or more status messages indicate an amount of data the source device has currently used of a data plan of the source device.

16. The one or more computer computer-readable memory devices of claim 15 having further computer-executable instructions comprising:

ending tethering in response to a request from the target device, or based upon an inability to communicate over the first communications mechanism, or based upon user interaction with the source device.

17. The one or more computer computer-readable memory devices of claim 15 wherein the target device outputs status information regarding the source device on a display of the target device and wherein the one or more status messages further comprises roaming data.

18. The one or more computer-readable memory devices of claim 15 wherein receiving the request over the first communications mechanism further comprises:

receiving a request at a wireless low-energy-based listening service, and wherein automatically providing tethering comprises launching a sharing service on the source device in response to the request.

* * * * *